(12) United States Patent
Elshaer et al.

(10) Patent No.: US 12,027,986 B2
(45) Date of Patent: Jul. 2, 2024

(54) MAGNETIC INTEGRATION OF THREE-PHASE RESONANT CONVERTER AND ACCESSORY POWER SUPPLY

(71) Applicant: Ford Global Technologies, LLC, Dearborn, MI (US)

(72) Inventors: Mohamed Elshaer, Canton, MI (US); Chingchi Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 271 days.

(21) Appl. No.: 17/145,079

(22) Filed: Jan. 8, 2021

(65) Prior Publication Data

US 2022/0224236 A1 Jul. 14, 2022

(51) Int. Cl.
| | | |
|---|---|---|
| *B60L 50/61* | (2019.01) | |
| *B60L 50/14* | (2019.01) | |
| *B60L 53/24* | (2019.01) | |
| *H01F 27/28* | (2006.01) | |
| *H01F 30/12* | (2006.01) | |
| *H02M 1/08* | (2006.01) | |

(Continued)

(52) U.S. Cl.
CPC ........ *H02M 3/33584* (2013.01); *H01F 27/28* (2013.01); *H01F 30/12* (2013.01); *H02M 1/08* (2013.01); *H02M 3/33592* (2013.01); *H01F 27/24* (2013.01)

(58) Field of Classification Search
CPC .......... B60L 50/14; B60L 50/51; B60L 50/61; B60L 53/22; B60L 53/24; B60L 58/10; B60L 2210/30; B60L 2240/527; B60L 2240/547; H02J 7/06; H02J 7/14; H02M 3/158; H02M 3/1582; H02M 5/10; H02M 5/293; H02M 7/219; H02M 7/5387; H02M 7/797; H02M 3/1584; H02M 3/33584; H02M 5/297; H02M 7/4807; B60Y 2200/91; B60Y 2200/92; Y02T 10/62; Y02T 10/70; Y02T 10/7072; Y02T 10/72; Y02T 10/92; Y02T 90/14
USPC ................................................. 307/9.1, 10.1
See application file for complete search history.

(56) References Cited

U.S. PATENT DOCUMENTS

| | | | |
|---|---|---|---|
| 2004/0179380 A1* | 9/2004 | Yamashita | H02M 3/33573 363/52 |
| 2015/0102882 A1* | 4/2015 | Shudarek | H01F 3/14 336/10 |

(Continued)

OTHER PUBLICATIONS

Chao Fei et al., "High-Frequency Three-Phase Interleaved LLC Resonant Converter With GaN Devices and Integrated Planar Magnetics", IEEE Journal of Emerging and Selected Topics in Power Electronics, vol. 7, No. 2, Jun. 2019, pp. 653-663.

(Continued)

*Primary Examiner* — Rexford N Barnie
*Assistant Examiner* — Xuan Ly
(74) *Attorney, Agent, or Firm* — David B. Kelley; Brooks Kushman P.C.

(57) ABSTRACT

A power system includes a traction battery, an auxiliary battery, and a 3-phrase resonant DC/DC converter that permits charge and discharge of the traction battery, and includes a 3-phase transformer, 3-phase matching capacitors, and 3-phase resonant inductors. The vehicle also includes auxiliary circuitry that permits charge of the auxiliary battery with power from the traction battery, and is magnetically coupled with the 3-phase transformer.

6 Claims, 2 Drawing Sheets

(51) Int. Cl.
  *H02M 3/158* (2006.01)
  *H02M 3/335* (2006.01)
  *H01F 27/24* (2006.01)

(56) References Cited

U.S. PATENT DOCUMENTS

| | | | |
|---|---|---|---|
| 2016/0254756 A1 | 9/2016 | Yang et al. | |
| 2018/0222333 A1* | 8/2018 | Khaligh | H02M 3/33584 |
| 2019/0379291 A1* | 12/2019 | Xue | H02M 7/219 |
| 2021/0039506 A1* | 2/2021 | Lee | B60L 50/61 |
| 2021/0155100 A1* | 5/2021 | Khaligh | H02M 1/4208 |
| 2022/0037074 A1* | 2/2022 | Tashiro | H01F 27/2804 |
| 2022/0286055 A1* | 9/2022 | Baranwal | H02J 7/06 |

OTHER PUBLICATIONS

Gui-Jia Su, "Comparison of Si, SiC, and GaN Based Isolation Converters for Onboard Charger Applications". 2018 IEEE Energy Conversion Congress and Exposition (ECCE) Conference dated Sep. 23-27, 2018, pp. 1233-1239.

Yichao Tang et al., "An Integrated Dual-Output Isolated Converter for Plug-in Electric Vehicles", IEEE Transactions on Vehicular Technology, vol. 67, No. 2, Feb. 2018, pp. 966-976.

* cited by examiner

MAGNETIC INTEGRATION OF THREE-PHASE RESONANT CONVERTER AND ACCESSORY POWER SUPPLY

TECHNICAL FIELD

This disclosure relates to vehicle power electronic components.

BACKGROUND

Certain automotive vehicles may include traction batteries that provide energy to and store energy from one or more electric machines. These same vehicles may also include auxiliary batteries for other purposes.

SUMMARY

A power system includes a traction battery, an auxiliary battery, a 3-phrase resonant DC/DC converter, and auxiliary circuitry. The 3-phrase resonant DC/DC converter permits charge and discharge of the traction battery, and includes a 3-phase transformer, 3-phase matching capacitors, and 3-phase resonant inductors. The auxiliary circuitry permits charge of the auxiliary battery with power from the traction battery, and is magnetically coupled with the 3-phase transformer.

A method for controlling a 3-phrase resonant DC/DC converter includes turning off each of a plurality of synchronous rectifier switches of auxiliary circuitry after a delay time that begins after a body diode of the synchronous rectifier switch is reversed biased such that a voltage at a DC link capacitor of the auxiliary circuitry is greater than a voltage of an auxiliary battery electrically connected to the auxiliary circuitry.

An automotive power system includes a 3-phase transformer having an EI ferrite core, a plurality of primary coils, and a plurality of secondary coils, 3-phase matching capacitors, and 3-phase resonant inductors. The 3-phase transformer, 3-phase matching capacitors, and 3-phase resonant inductors are arranged to form a 3-phase resonant DC/DC converter that permits charge and discharge of a traction battery. The automotive power system also includes auxiliary circuitry, including a plurality of auxiliary coils, that permits charge of an auxiliary battery with power from the traction battery. For each phase of the 3-phase transformer, one of the primary coils, one of the secondary coils, and one of the auxiliary coils are wrapped around a same leg of the EI ferrite core.

DETAILED DESCRIPTION

Figure 1:
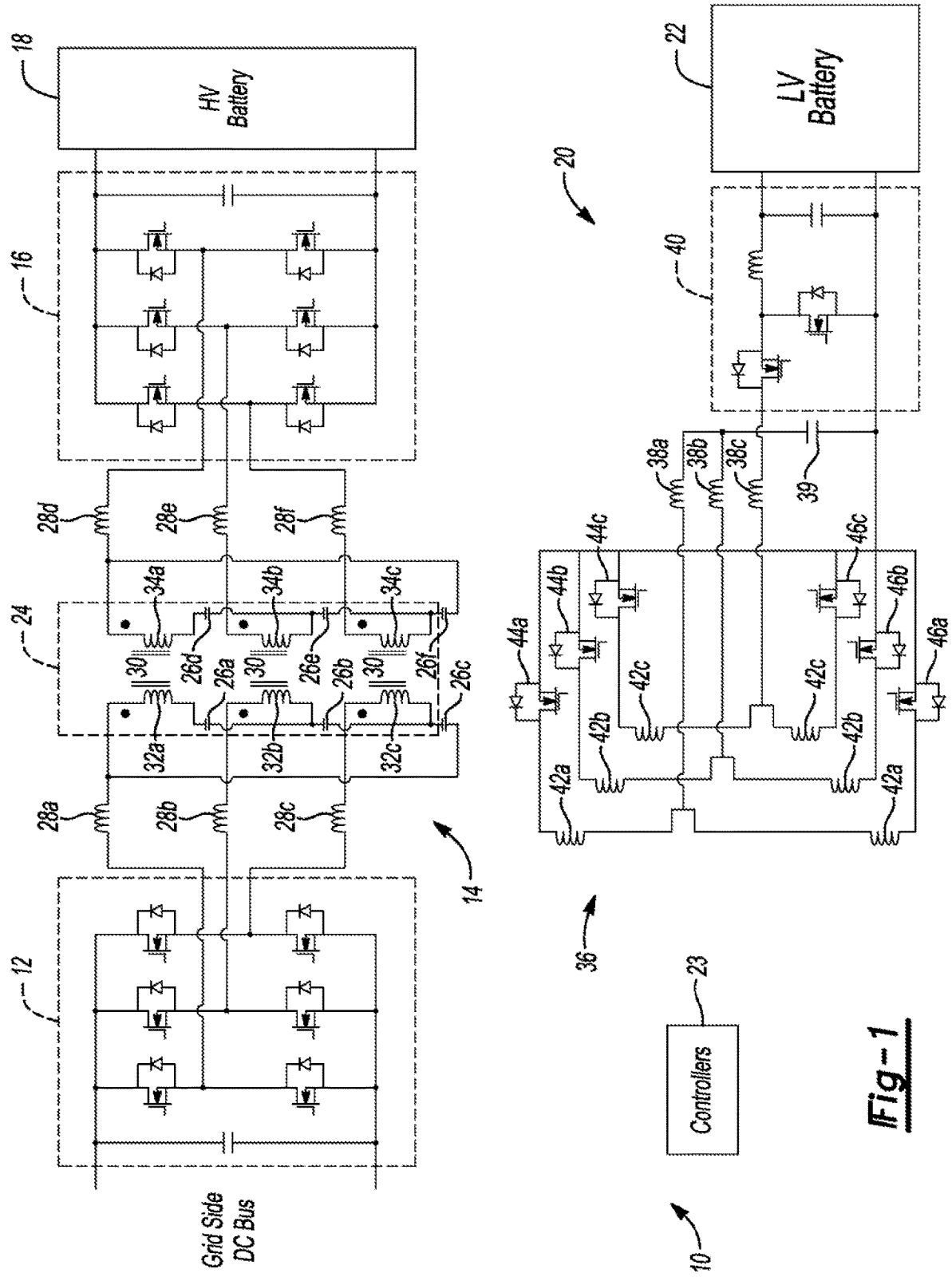
FIG. 1 is a schematic diagram of a proposed three-phase integrated charger.

The disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

With the increased adoption of plugin electric vehicles, more cars are being sold with a bi-directional onboard charger. Integrating the DC-DC converter and charger may thus offer benefits in terms of reducing the overall system cost and increasing its power density. Typically, the power rating of an onboard charger is a multiple order of magnitude higher than the high voltage to low voltage DC-DC converter. To increase the overall charger efficiency, a three-phase isolated DC-DC stage can be implemented in the on-board charger stage. Power is split among the phases, and current stress in components is reduced.

On the other hand, the DC-DC converter is typically implemented using a single-phase topology. While it is sufficient to use a single switch for the primary H-bridge, the secondary current doubler rectifier may require paralleled switches to distribute the losses. Given the tradeoff between semiconductor cost and magnetic cost, this approach has been taken in the past.

Currently, at the vehicle system level, the onboard charger and DC-DC converter are implemented by two different circuits in some circumstances. To reduce the overall system cost and increase the system power density, there is a need for a new integrated circuit. Such implementation may maximize the utilization of space and reduce the part count.

Prior implementations of integrated chargers are mainly single phase. An integrated dual-output isolated converter has previously been proposed. A single-phase transformer is used to magnetically couple the high voltage to low voltage auxiliary circuit to a bidirectional charger. A full-bridge converter is used to regulate and rectify the power to the low voltage battery. Another implementation has also previously been proposed. In this implementation, a center-tapped full-bridge rectifier is used at the low voltage side in conjunction with a low voltage buck converter for regulating the power delivered to the low voltage battery.

Through the utilization of flux cancellation in balanced three-phase magnetic structures, it has been demonstrated that three-phase transformers are more efficient and smaller in size than their single-phase counterparts. A unidirectional three-phase resonant DC-DC converter previously been proposed. A delta-Cr matching capacitive network is used at the primary side to improve the current sharing between the three phases. Another variation of this topology was previously introduced to realize bi-directional power transfer.

Thus far, integration of the auxiliary high voltage to low voltage DC-DC converter has been demonstrated by single-phase topologies. There is a need for a new integrated circuit topology that allows for integrating the DC-DC converter without compromising efficiency and power density of the onboard charger circuit.

For higher power applications, multi-phase (e.g., 3-phase) resonant DC-DC converters are used to allow for increasing the power capability and power density of the on-board charger DC-DC stage. Here, a new circuit topology is proposed to magnetically integrate the DC-DC converter to a three-phase bidirectional DC-DC converter (FIG. 1). A symmetrical magnetic topology is proposed to achieve the same gain for bi-directional power flow between the grid and high voltage battery. While there are many ways to connect the transformer windings and matching capacitors (e.g., delta-delta, delta-Y, etc.), the delta-Cr connection is chosen in this example to realize an inherent current sharing between all phases.

Figure 2:
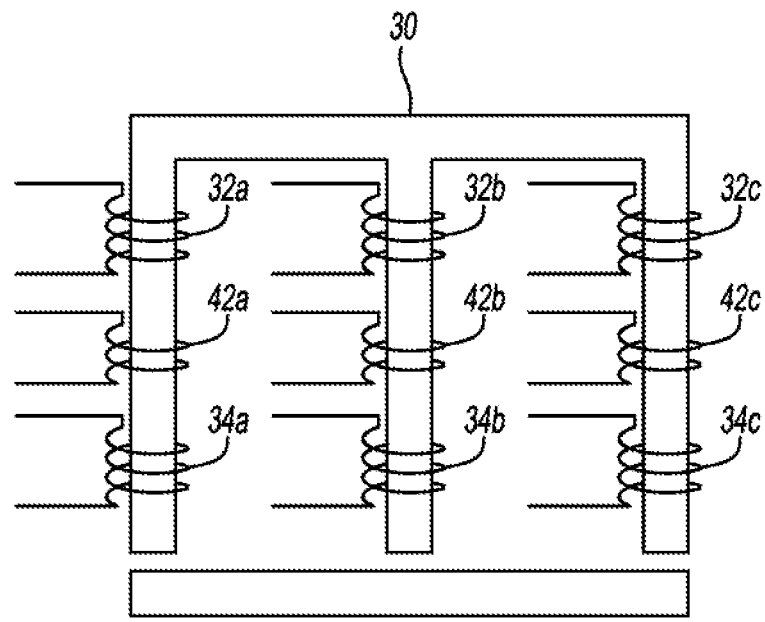
FIG. 2 is a schematic diagram of a proposed magnetic device.
Figure 3:
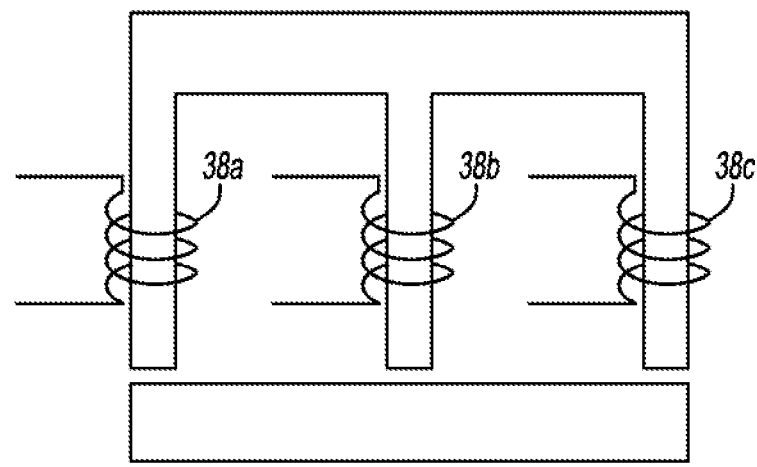
FIG. 3 is a schematic diagram of a magnetically coupled three-phase filter inductor.

Magnetic integration of the low voltage coils is realized by inserting two low voltage coils around each of the core elements; thus symmetric transformer structure is realized. During grid-to-vehicle and vehicle-to-grid operations, the low voltage coils are not exited with current. The transformer's magnetizing inductance and windings turn ratios are optimized to keep the low voltage port no-load voltage low. During the high voltage battery-to-low voltage battery power transfer, the grid side H-bridge is not operated. A no-load voltage appears at the grid-side DC bus. Due to the balanced three-phase operation in all power flow directions, flux cancellation is realized between the transformer phases permitting the utilization of the symmetric magnetic device (FIG. 2). Additionally, ferrite utilization in the output low voltage filter inductors are reduced by coupling the three filter inductors in a single magnetic structure (FIG. 3).

A center-tapped full-bridge rectifier is formed by the two low voltage coils in conjunction with the low voltage switching. The low voltage switches are used to serve dual purpose: synchronous rectification and low voltage battery power regulation. Synchronous rectification is realized by modulating the switches to turn-on during the body diode conduction. Power regulation is realized by delaying the turn-off of the switch after its body diode is reversed biased. By controlling the peak reverse current, the low voltage output of the three-phase converter is regulated. To improve efficiency and reduce the current stress on all components, a low voltage-buck converter is used to couple the output of the three-phase rectifier to the low voltage battery. The low voltage port of the three-phase converter is allowed to fluctuate depending on the power and voltage delivered to the high voltage battery. The magnetic structure is designed such that the low voltage output is always greater than the maximum voltage of the low voltage battery. The buck converter is used to step down the low voltage output and regulate the power delivered to the low voltage battery.

To reduce the DC-DC converter size, magnetic integration with the onboard charger offers many attractive benefits. Up to 60% reduction in the DC-DC board size is achieved through the elimination of the high voltage primary circuit, high voltage connector, and high voltage electromagnetic interference filter. The proposed topology offers a solution for integrating the DC-DC converter to a three-phase resonant converter. Through the utilization of flux cancellation, over 30% reduction in ferrite utilization is realized in the transformer and output low voltage filter inductors.

FIG. 1 shows such a power system 10, which can be used for a vehicle. The power system 10 includes an inverter 12, a three phase resonant DC-DC converter 14, a rectifier 16, and a high voltage (traction) battery 18. The three phase resonant DC-DC converter 14 is electrically between the inverter 12 and rectifier 16. The rectifier 16 is electrically between the three phase resonant DC-DC converter 14 and the high voltage battery 18. The power system 10 also includes auxiliary high voltage to voltage circuitry 20, a low voltage battery 22, and one or more controllers 23.

The controllers 23 are in communication with/exert control over the components of FIG. 1 as described below. Also, the controllers 23 within the context of a vehicle may communicate via one or more vehicle networks. The vehicle network may include a plurality of channels for communication. One channel may be a serial bus such as a CAN. One of the channels may include an Ethernet network defined by the Institute of Electrical and Electronics Engineers 802 family of standards. Additional channels may include discrete connections between modules and may include power signals from the low voltage battery 22. Different signals may be transferred over different channels. For example, video signals may be transferred over a high-speed channel (e.g., Ethernet) while control signals may be transferred over CAN, etc.

As apparent to those of ordinary skill, the inverter 12, three phase resonant DC-DC converter 14, and rectifier 16 form a portion of an on-board charger. The power factor correction stage, for example, is omitted but would appear to the left of the inverter 12 on the page. Such on-board charging components are generally known to those of ordinary skill and therefore not included here for the sake of focus.

The three phase resonant DC-DC converter 14 includes a three phase transformer 24, three phase matching capacitors 26a, 26b, 26c, 26d, 26e, 26f connected in a symmetric delta configuration, and three phase matching inductors 28a, 28b, 28c, 28d, 28e, 28f. The three phase transformer 24 includes a ferrite EI core 30, primary coils 32a, 32b, 32c connected in a three phase balanced configuration, and secondary coils 34a, 34b, 34c connected in a three phase balanced configuration. The inductors 28a, 28d, the primary coil 32a, and the secondary coil 34a correspond to a first phase. The inductors 28b, 28e, the primary coil 32b, and the secondary coil 34b correspond to a second phase. The inductors 28c, 28f, the primary coil 32c, and the secondary coil 34c correspond to a third phase. Tuning of such components can be performed in usual fashion via testing, simulation, etc. to achieve the desired performance for a particular application.

The inverter 12 and rectifier 16 are constructed of switching elements (e.g., insulated gate bipolar transistors, metal oxide silicon field effect transistors, etc.) with corresponding diodes, and capacitors in usual fashion. Such construction and operation is generally known to those of ordinary skill. Further explanation is therefore not necessary.

The auxiliary high voltage to voltage circuitry 20 includes a coil arrangement 36, three phase magnetically coupled inductors 38a, 38b, 38c, a DC link capacitor 39, and a bi-directional buck converter 40. The three phase magnetically coupled inductors 38a, 38b, 38c are electrically between the coil arrangement 36 and the DC link capacitor 39. The DC link capacitor 39 is electrically between the three phase magnetically coupled inductors 38a, 38b, 38c and the bi-directional buck converter 40. The bi-directional buck converter 40 is electrically between the DC link capacitor 39 and the low voltage battery 22.

The coil arrangement 36 includes auxiliary coils 42a, 42b, 42c connected in a three phase balanced configuration and synchronous rectifier switches 44a, 44b, 44c, 46a, 46b, 46c, each of which includes a corresponding body diode. The synchronous rectifier switches 44a, 46a are electrically connected in series on either side of the auxiliary coil 42a. The synchronous rectifier switches 44b, 46b are electrically connected in series on either side of the auxiliary coil 42b. The synchronous rectifier switches 44c, 46c are electrically connected in series on either side of the auxiliary coil 42c. As mentioned above, the auxiliary coils 42a, 42b, 42c are center tapped, and the synchronous rectifier switches 44a, 44b, 44c, 46a, 46b, 46c are configured to regulate a voltage at the DC link capacitor 39 such that the voltage is greater than a voltage of the low voltage battery 22. This regulation is accomplished by turning off each of the synchronous rectifier switches 44a, 44b, 44c, 46a, 46b, 46c after a delay time that begins after a corresponding body diode of a particular synchronous rectifier switch is reversed biased (as opposed to turning of the switch immediately after the body diode is reversed biased). This delay time is defined by an error between a desired voltage at the DC link capacitor 39 and an actual voltage at the DC link capacitor 39.

The bi-directional buck converter 40 is constructed of switching elements with corresponding diodes, inductors, and capacitors in usual fashion. Such construction and operation is generally known to those of ordinary skill. Further explanation is therefore not necessary.

FIG. 2 shows the primary coil 32a, secondary coil 34a, and auxiliary coil 42a wrapped around a same leg of the ferrite EI core 30, the primary coil 32b, secondary coil 34b, and auxiliary coil 42b wrapped around a same leg of the ferrite EI core 30, and the primary coil 32c, secondary coil 34c, and auxiliary coil 42c wrapped around a same leg of the ferrite EI core 30. Magnetic integration of the three phase resonant DC-DC converter 14 and the low voltage battery 22 is thus achieved.

FIG. 3 shows each of the three phase magnetically coupled inductors 38a, 38b, 38c wrapped around a different leg of a ferrite EI core.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A power system comprising:
   a traction battery;
   an auxiliary battery;
   a 3-phrase resonant DC/DC converter, configured to permit charge and discharge of the traction battery, including a 3-phase transformer, 3-phase matching capacitors, and 3-phase resonant inductors; and
   auxiliary circuitry, including a bidirectional buck converter and a 3-phrase magnetically coupled inductor electrically between coils of the auxiliary circuitry and bi-directional buck converter, configured to permit charge of the auxiliary battery with power from the traction battery, magnetically coupled with the 3-phase transformer, wherein the auxiliary circuitry includes a DC link capacitor and synchronous rectifier switches configured to regulate a voltage at the DC link capacitor, including turning off each of the synchronous rectifier switches after a delay time that begins after a body diode of the synchronous rectifier switch is reversed biased, such that the voltage is greater than a voltage of the auxiliary battery.

2. The power system of claim 1, wherein each of the coils is center tapped.

3. The power system of claim 1, wherein the 3-phase transformer includes an EI ferrite core, and wherein for each phase of the 3-phase transformer, a primary coil of the 3-phase transformer, a secondary coil of the 3-phase transformer, and a coil of the auxiliary circuitry are wrapped around a same leg of the EI ferrite core.

4. The power system of claim 1 wherein primary coils of the 3-phase transformer, secondary coils of the 3-phase transformer, and coils of the auxiliary circuitry are connected in a 3-phase balanced configuration.

5. The power system of claim 1, wherein the delay time is defined by an error between a desired voltage at the DC link capacitor and an actual voltage at the DC link capacitor.

6. The power system of claim 1, wherein the 3-phase matching capacitors are connected in a symmetric delta configuration.

* * * * *